United States Patent

York et al.

[11] Patent Number: 5,926,392
[45] Date of Patent: Jul. 20, 1999

[54] SYSTEM AND METHOD FOR AUTOMATED DOCUMENT PROCESSING

[75] Inventors: Michael E. York, Sicklerville, N.J.; Gary R. Cane, Springfield, Pa.; George L. Hayduchok, Mt. Holly; Robert R. DeWitt, Marlton, both of N.J.

[73] Assignee: Opex Corporation, Moorestown, N.J.

[21] Appl. No.: 08/666,737

[22] Filed: May 17, 1996

[51] Int. Cl.⁶ ........................................... G06F 7/06
[52] U.S. Cl. ......................................... 364/478.11
[58] Field of Search ............... 364/478.11; 209/3.1, 209/509, 540, 552, 567, 569, 576, 583, 584, 900; 271/110, 111, 114, 185, 184, 186, 265.01, 270, 265.02, 202, 182; 101/230, 231

[56] References Cited

U.S. PATENT DOCUMENTS

| | | | |
|---|---|---|---|
| 4,863,037 | 9/1989 | Stevens et al. | 209/3.1 |
| 4,893,804 | 1/1990 | Sasage et al. | 271/3.1 |
| 5,240,116 | 8/1993 | Stevens et al. . | |
| 5,246,223 | 9/1993 | Ricciardi et al. | 271/149 |
| 5,293,431 | 3/1994 | Hayduchok et al. . | |
| 5,460,273 | 10/1995 | Stevens et al. | 209/584 |
| 5,590,872 | 1/1997 | Oominiami et al. | 271/176 |

*Primary Examiner*—Thomas R. Peeso
*Attorney, Agent, or Firm*—Dann Dorfman, Herrell & Skillman, P.C.; Stephen H. Eland

[57] ABSTRACT

An apparatus is provided for processing a batch of remittance transactions in the form of an invoice and an accompanying check. A feeder receives a stacked batch of transactional pairs of documents and serially feeds the documents along a selected path of movement. Scanning cameras scan the front and back of each document to provide front and back images of the documents. A magnetic imager is employed for reading the magnetic markings of each check to detect the orientation of each check. From the magnetic imager, the documents are fed to a document-reordering device that functions to selectively change the sequential order of selected pairs of documents along the path of movement. A document orientor is also provided for selectively changing the orientation of any selected document along the path of movement. The document orientor includes a document reverser for reversing the orientation of selected documents from back to front along the path of movement. A document twister is also provided along the path of movement for flipping selected documents from an upside-down orientation into a right-side-up orientation. A document sorter selectively directs the documents into selected output areas or bins.

4 Claims, 8 Drawing Sheets

SYSTEM AND METHOD FOR AUTOMATED DOCUMENT PROCESSING

FIELD OF THE INVENTION

The present invention relates to a system and method for processing documents and, more specifically, to an apparatus and method for reordering, reorienting and sorting documents, and particularly remittance transactions in the form of an invoice and an accompanying check.

BACKGROUND OF THE INVENTION

Automated and semi-automated machines have been employed for processing documents such as bulk mail. Due to the large quantity of mail received by many companies, there has long been a need for efficient sorting of incoming mail. Document sorting has become particularly important in the area of remittance processing.

Utility companies, phone companies, and credit card companies routinely receive thousands of payment envelopes from their customers on a daily basis. Typically, a customer payment envelope contains an invoice stub and some type of customer payment, usually in the form of a bank check or money order.

In order to perform remittance processing, the remittance transaction is initially extracted from the envelope. In some instances, the extraction may be done manually. In other instances, the extraction may be done in an automated manner. However, regardless of the manner in which the remittance transactions are extracted, further processing of the invoices and accompanying checks is still required before remittance processing can be effected.

Remittance processing equipment typically requires each batch of remittance transactions to be organized so that each invoice-check pair is properly ordered and oriented. For example, conventional remittance processing equipment may require each transactional pair of documents to be ordered so that the invoice is positioned in front of or on top of each check. Furthermore, each invoice and each check must be oriented in a right-side-up, face-forward orientation.

In accordance with the present invention, an apparatus and method are provided for reordering and reorienting a batch of transactional pairs of documents that have been extracted from payment envelopes for subsequent remittance processing.

SUMMARY OF THE INVENTION

In accordance with the present invention, a system for processing a stacked batch of at least transactional pairs of documents previously extracted from envelopes is provided. A single transaction defines the contents of a single envelope. A transaction preferably includes a pair of documents, such as an invoice and an accompanying check. However, if envelopes are misstuffed, for example, a transaction may include a single document, such as only a check or only an invoice. Similarly, a transaction may include two invoices and a single check. One of the difficulties, of course, is determining transactional boundaries, i.e. where one transaction or group of documents ends and where the next transaction or group of documents begins. Determining transactional boundaries is particularly difficult if document processing commences after the documents have already been extracted from envelopes and stacked together. Accordingly, the system may include a system controller that functions to accurately track the sequential order of the documents being processed. As a result, the system can function to reorder proper document pairs that are otherwise out of sequential order, but still function to detect and optionally offsort or reject single document or triple document transactions.

The system includes an input bin for receiving the stacked batch of at least the pairs of documents previously extracted from the envelopes. A document transport conveys transactional pairs of documents along a selected path of movement. An orientation detector is provided along the path of movement for detecting the orientation of at least one document of each pair of documents along the selected path of movement.

A document orientor is provided along the path of movement for selectively changing the orientation of at least the one document of selected pairs of documents along the path of movement in response to the orientation detector. The document orientor may include a document reverser for reversing the orientation of selected documents from back to front along the path of movement. The document orientor may also include a document twister for flipping selected documents from an upside-down to a right-side-up orientation.

A document-order detector is provided for detecting the order of each document of the pair of documents along the selected path of movement. A document reordering device is provided along the path of movement for selectively changing the sequential order of selected pairs of documents along the path of movement in response to the document-order detector.

Optionally, a document sorter is also provided for sorting the documents along the path of movement into selected output areas based on selected characteristics of at least one document of the pair of documents. For example, documents having a characteristic in which an address box is marked may be sorted to a selected output bin. Alternatively, a document having a selected characteristic of excessive thickness or an undetectable orientation may be sorted to a reject bin.

A method of processing a stacked batch of at least transactional pairs of documents is also provided. In accordance with the method, pairs of documents are conveyed along a selected path of movement. The orientation of at least one document of the pair of documents is detected. For example, the orientation of a document may be detected to determine whether such document is in a face-forward, right-side-up orientation or in some other orientation, such as a face-forward, upside-down orientation; a face-backward, right-side-up orientation; or a face-backward, upside-down orientation. The method also includes the steps of selectively orienting the at least one document of selected pairs of documents along the path of movement in response to the detection of the orientation of such document along the path of movement. Optionally, the order of each document of the pair of documents along the selected path of movement is also detected to determine which document of the pair is leading the other document. For example, in a remittance transaction, the particular order of the invoice and check is detected to determine whether the invoice leads the check along the path of movement or whether the check leads the invoice along the path of movement. The method also includes the step of selectively changing the sequential order of selected pairs of documents along the path of movements in response to the detection of the order of the pair of documents.

The apparatus in accordance with the present invention also provides a document feeder that serially feeds documents onto a document transport for conveying the documents along the selected path of movement through a document processing system. The feeder automatically adjusts the pitch between successive documents, e.g. the leading edge of one document relative to the leading edge of a successive document, to provide sufficient spacing between successive documents to enable selected documents to be reordered, if necessary, along the selected path of movement without interruption or interference with the serial flow of the documents along the selected path of movement. By providing a more uniform pitch, the gaps between successive documents can be decreased to thereby increase the throughput of the apparatus. In this way, the rate at which documents are processed can be increased without increasing the speed at which documents are transported through the system.

By controlling the pitch between successive documents more precisely, the processing of documents is improved. For example, when a pair of documents are reordered so that the sequence of the two documents along the path of movement is reversed, it is advantageous to maintain precise spacing between the two documents. To effect the reordering of the two documents, the leading document is directed along a longer path of movement while the trailing document is directed along a shorter path of movement. As a result, the trailing document advances in front of the leading document along the path of movement to effect document reordering. The individual documents are then returned to a common transport path. If the spacing between the two documents is not precisely controlled, there is an increased probability that the two documents will overlap or jam when the documents are returned to the common transport path.

In order to control document pitch, the apparatus includes two sensors positioned along the path of movement. A sensor along the path of movement senses the leading edge of a first document and provides an output regarding the position of the lead edge of the first document to a system controller. Another sensor along the path of movement senses the lead edge of a second document and provides an output regarding the position of the lead edge of the second document to the system controller. The documents are conveyed between the two sensors by a variable speed document transport. A variable speed motor drives the document transport and is controlled by the system controller. The controller is operable to receive the outputs from the two sensors, and determine the gap or pitch between the first and second documents in response to the output from the two sensors. Based on the determination of the gap or pitch between the successive documents, the controller is operable to vary the speed of the motor to adjust the gap between the first and second documents.

DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
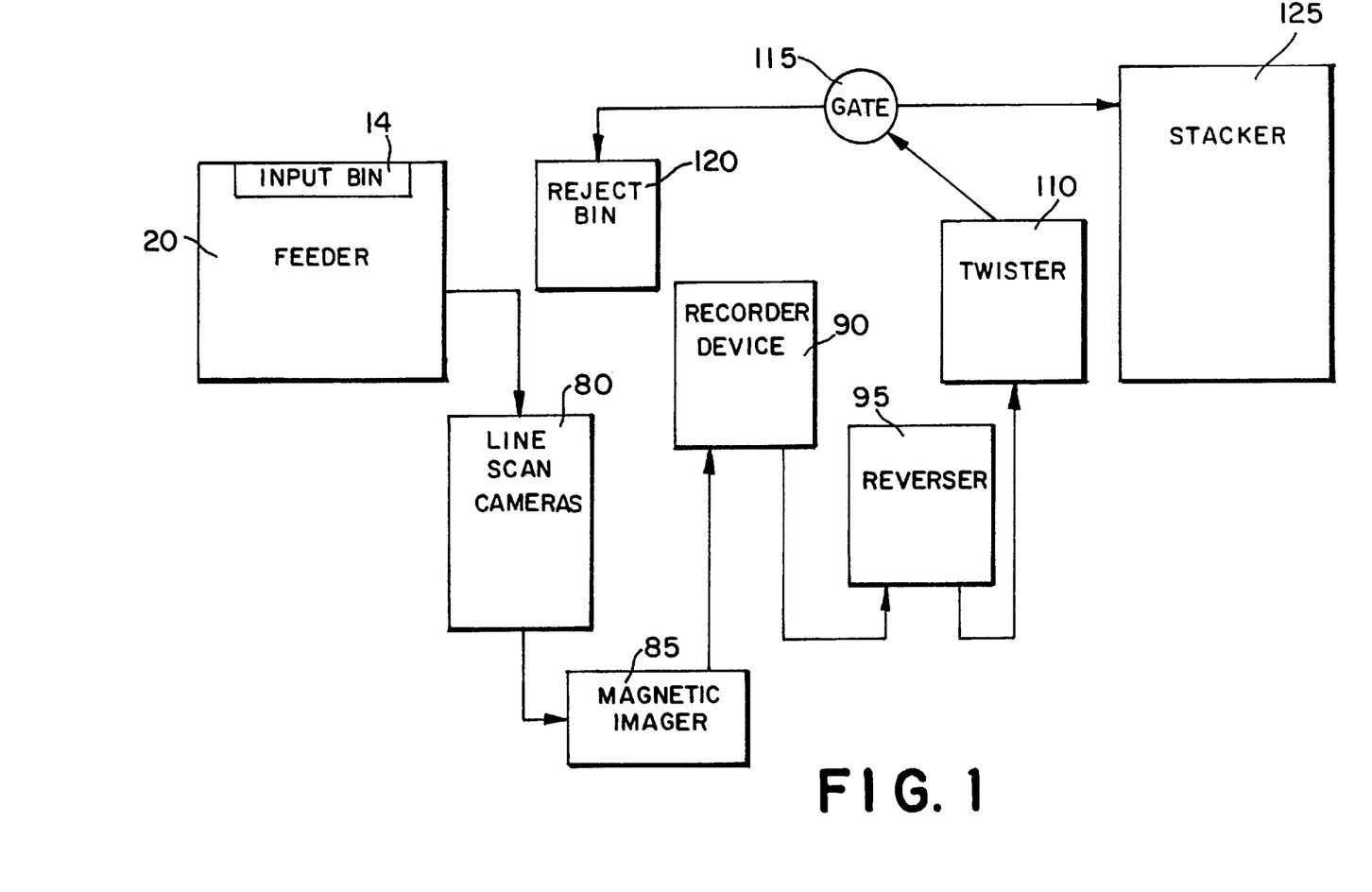
FIG. 1 is a block diagram showing the flow of documents through an automated document processing apparatus in accordance with the present invention.
Figure 2:
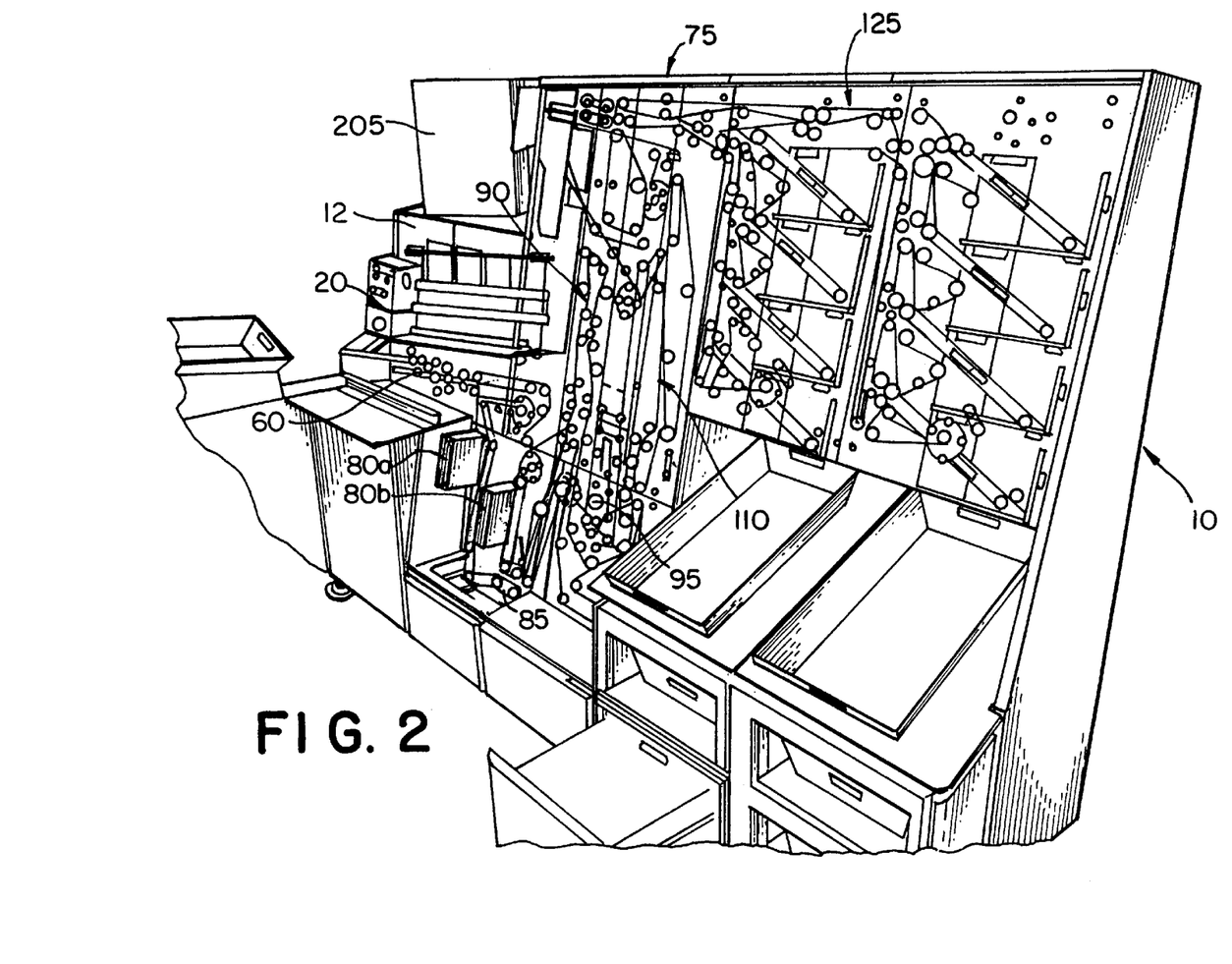
FIG. 2 is a fragmentary schematic perspective view of the automated document processing apparatus.

Referring to the drawings in general and more specifically to FIGS. 1 and 2, an apparatus for the automatic processing of documents is illustrated. More specifically, the apparatus 10 functions to process a batch of transactional pairs of documents, such as an invoice and an accompanying check, that have been extracted from payment envelope. The apparatus 10 functions to provide each transactional pair of documents in a selected sequential order and in a selected orientation for supply to a remittance processing apparatus. The apparatus 10 processes the documents by manipulating the transactional pairs of documents into the proper sequential order and orientation, when necessary, and then by sorting and stacking the documents at selected output areas based upon selected criteria. A controller 15, in the form of a microprocessor controller, monitors and controls the flow of the documents based on feedback received from various components of the apparatus 10.

Referring to FIG. 1, a general overview of the flow of documents through the apparatus is provided. Initially, a stacked batch of mail 16 that has been extracted from envelopes is placed into an input bin 14 of a document feeder 20. The batch of mail includes transactional pairs of documents in the form of an invoice and/or check. The feeder 20 includes a compensation zone 60 through which the documents are serially fed from the input bin 14. In the compensation zone 60, the pitch between leading edges of successive documents is adjusted to fall within a predetermined range.

From the compensation zone 60, the documents enter a system transport 76 that conveys the documents through the system between the document feeder 20 and an output stacker 125. The flow of the documents through the system is illustrated in greater detail in FIG. 7. The system processes the documents by determining the order and orientation of the documents as the documents are conveyed through the system. The system then functions to selectively reorder documents that are out of sequence along the path of movement into the proper sequence along the path of movement, and to selectively orient documents into a selected orientation along the path of movement. For example, a selected sequential order of documents conveyed along the path of movement may include pairs of documents in an invoice-check sequence. Consequently, if a pair of documents in the stack 16 is misordered into a check-invoice order, the system functions to change the misordered pair into the proper invoice-check sequence while the documents are conveyed along the path of movement. Similarly, a selected orientation for each document may be a face-forward, right-side-up orientation. Consequently, if a document is in an undesired orientation, the system functions to twist and/or flip the document into the desired orientation.

For this purpose, the system transport 76 serially conveys the documents past an imager module 80 that includes a pair of scanning cameras 81*a*, 81*b*. The imager module in cooperation with the system controller 15 functions to detect the orientation of the documents, such as the invoices, based on the image scanned by the cameras. A pair of cameras is provided so that both sides of the invoice can be scanned. The cameras may also be used to scan both sides of each check.

The documents are then conveyed by system transport 76 to a MICR module 85 that functions as a magnetic imager to determine the orientation of the checks. The MICR module 85 first imparts a magnetic charge to the magnetic ink on the checks. The orientation of each check is then detected by reading the flux variation of the characters or markings on the check as the check is conveyed past the MICR module 85. The magnetic readings for the checks are interpreted by the MICR Module 85 to determine the orientation of each check. The orientation decision by the MICR Module 85 is transmitted to the system controller 15 which electronically tags the respective document with the orientation decision data. The sequential order of transactions, i.e. invoice-check pairs, is also determined by the system controller 15 based on the data from the imager module 80 and the MICR module 85.

As the transactional pairs of documents are conveyed through the system, the system controller 15 electronically tags each document in sequential order as being a check or an invoice based on the data from the imager module 80 and the MICR module 85. For example, if the imager module 80 scans a check in the sequential order where an invoice is expected to be, then the system controller 15 may then determine that the check is out of order. Likewise, if the MICR module 85 detects no magnetic markings on a document that is expected to be a check at that position in the sequential order, then the system controller 15 may then determine that the document is out of order.

Once the order and orientation of the documents is determined, the system reorders and/or reorients the documents as necessary. From the MICR module 85, the documents first enter a reordering device 90. The reordering device 90 functions to reorder the sequence of two successive documents if the two documents are determined to be in the wrong sequence. For instance, if a corresponding check and invoice are being conveyed so that the check precedes the invoice, in an application where the invoice should precede the check, the reordering device 90 switches the sequence of the check and invoice so that the invoice precedes the check along the path of movement.

From the reordering device 90, the documents are conveyed to a reverser 95. The reverser 95 functions to reorient the documents, if necessary, by flipping the documents from end to end along the path of movement so that the leading edge becomes the trailing edge and the trailing edge becomes the leading edge. As a result, a selected document may be flipped, if necessary, from front to back along the path of movement.

From the reverser 95, the documents are conveyed to a twister 110. If a document is not properly oriented in a right-side-up orientation, the document is reoriented by the twister. The twister 110 reorients a document by flipping the document about a horizontal axis so that the top and bottom edge of the document becomes the bottom edge and the bottom edge becomes the top edge. More specifically, the document is transported between belts that twist 180 degrees along the run of the belts. In this way, the document is inverted from an upside-down orientation into a right-side-up orientation. At the same time, because the document is rotated by the twister, the document is also flipped from front to back.

Figure 8:
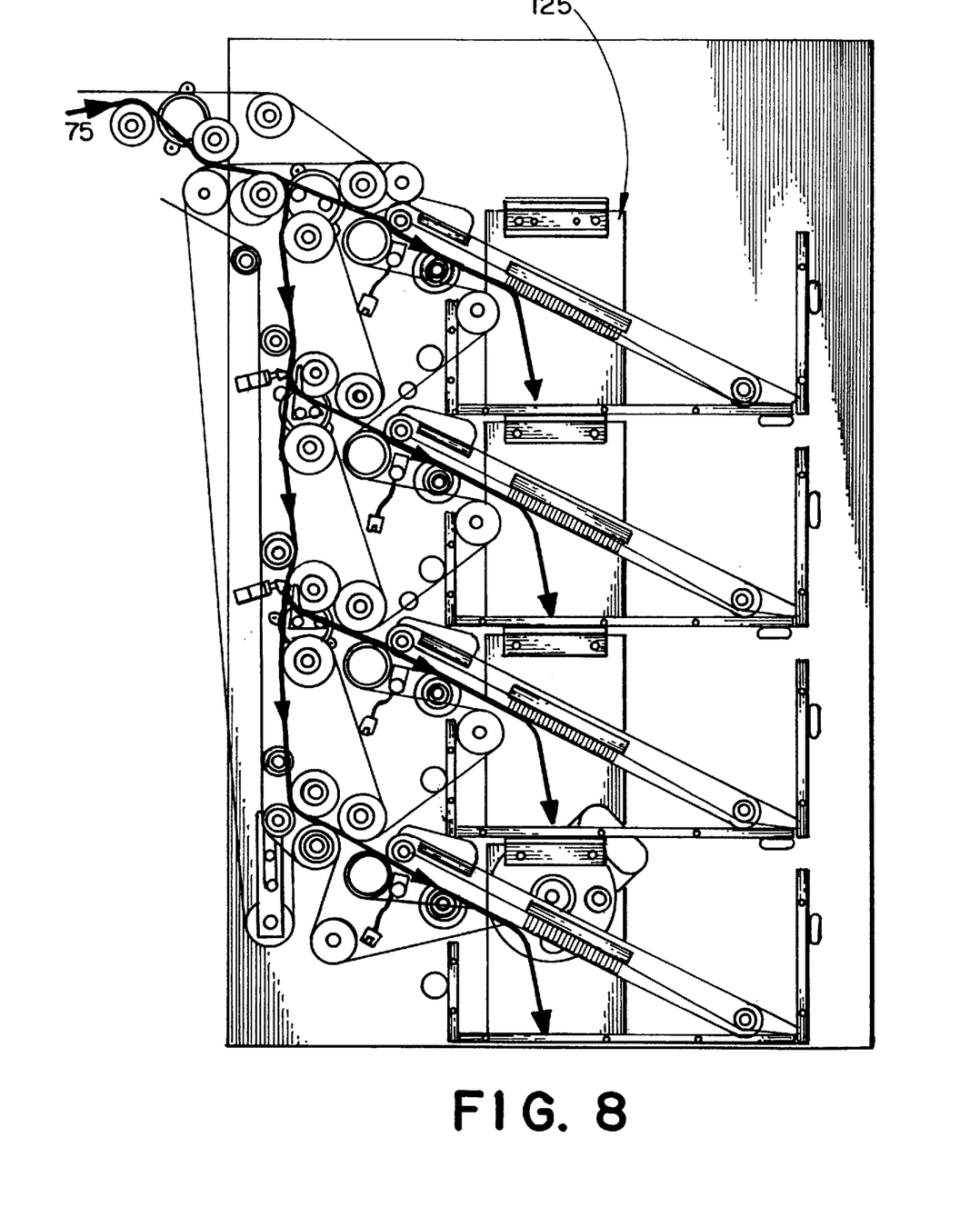
FIG. 8 is an enlarged fragmentary front elevational view of the stacker of the automated document processing apparatus shown in FIG. 2, illustrating the flow of documents through the stacker.

From the twister 110, the documents are conveyed to a gate 115 that directs each document either to a stacker 125 or to a reject bin 120. The stacker 125 sorts and stacks the documents into a series of output bins. The flow of the documents through the output stacker 125 is illustrated in FIG. 8. If an error occurs during processing of documents, such as pairs of documents being conveyed in face-to-face engagement, instead of one at a time, the documents may be directed to the reject bin 120 instead of the stacker 125. Likewise, if something is improper with a selected transactional set of documents, the documents may also be conveyed to the reject bin 120. For example, if the pitch or gap between successive documents is outside an acceptable range, the pair of documents may be sent to the reject bin. Also, if the orientation of a document is not determinable, the document may be sent to the reject bin. Further, if the transactional count is improper, e.g. a single or multiple document transaction instead of a transactional pair, the documents may be sent to the reject bin.

Figure 3:
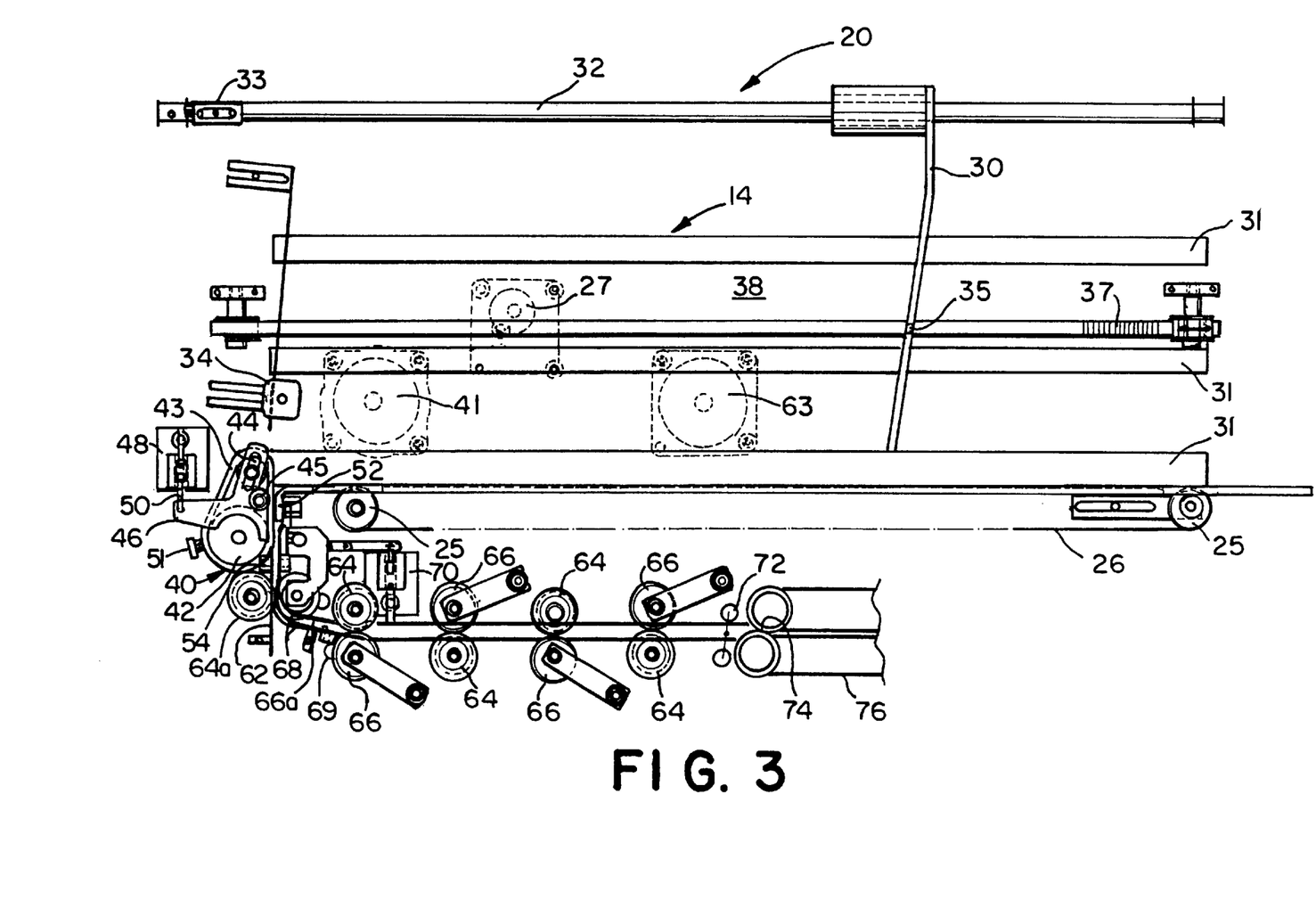
FIG. 3 is an enlarged fragmentary front elevational view of the feeder of the automated document processing apparatus shown in FIG. 2.
Figure 6:
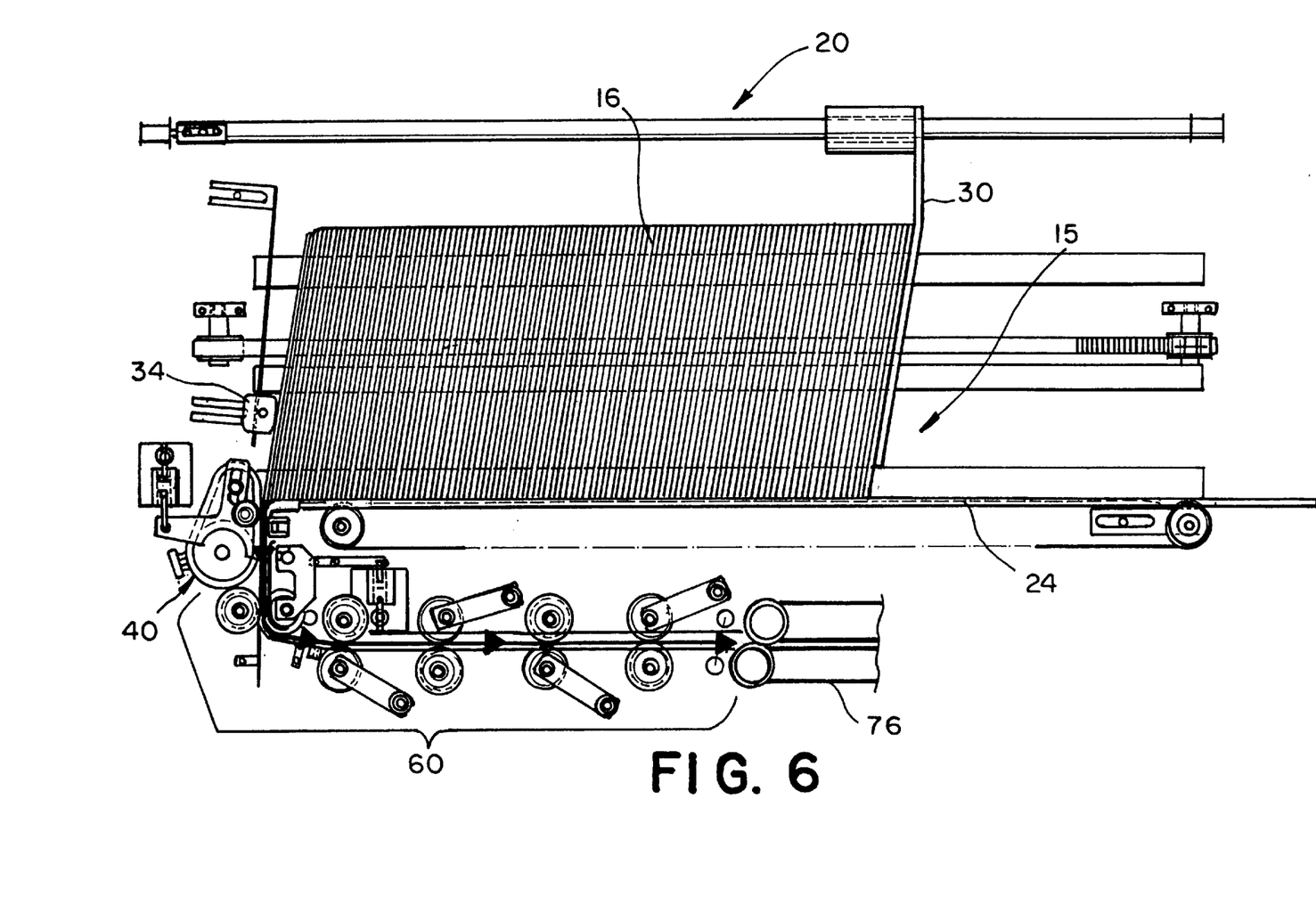
FIG. 6 is an enlarged fragmentary front elevational view of the feeder of the automated document processing apparatus shown in FIG. 2, illustrating the flow of documents through the feeder.

Referring now to FIGS. 3 and 6, the details of the document feeder 20 are shown in greater detail. To begin processing a batch of documents 16, an operator places a stack of documents 16 disposed in face-to-face engagement on an input conveyor 24 located at the bottom of the input bin 14 of the document feeder 20. The input conveyor 24 moves the documents toward a feed assembly 40 that functions to feed the documents one at a time from the stack 16 along a document feed path. The input conveyor 24 comprises a pair of parallel belts 26 that are carried on a pair of pulleys 25 which are driven by a motor 27. To improve the feeding of the documents, the input conveyor 24 may be angled downward toward the feed assembly 40 so that gravity aids the flow of documents toward the feed assembly 40.

The document bin 14 also includes a series of plastic glide strips 31 mounted on a wall surface of base plate 28 of the apparatus 10. The glide strips 31 are oriented generally parallel to one another and extend longitudinally of the document bin to provide a glide surface for the stack of documents conveyed by the conveyor belts 26 through the bin toward feed assembly 40. As the stack of documents is moved toward the feed assembly, the glide strips provide a low friction surface upon which the document stack rests and moves. For this purpose, the wall surface 38 may be titled back from a vertical orientation into a selected angle of orientation. A slight tilt enables the wall surface 38 to cooperate with the conveyor belts 26 to maintain and support the documents in a neat stack as the documents are conveyed through the bin 14.

The stack of documents 16 is manually loaded into the bin 14 with the longitudinal axis of the documents oriented in a generally vertical orientation. In other words, the stack 16 is positioned in the bin so that side edges of the documents in the stack 16 rest upon conveyor belts 26 while a bottom or top edge of each document rests upon the glide strips 31.

One end of the stack of documents 16 on the input conveyor 24 is supported by a document pusher 30 so that a face surface of the last document in the stack rests upon pusher 30. The document pusher 30 is a bent metal plate that may be removably positioned against the end of the stack of documents 16. The pusher 30 is bent at a selected angle of orientation relative to vertical to enable the stack of documents to lay back upon the pusher as the document stack is conveyed through the bin. The amount of bend in the pusher also serves to control the contact force with a motor-driven thumper feed wheel 34 disposed at the other end of the bin. The document pusher 30 is rotatably mounted on guide rail 32 that extends longitudinally of the bin. The pusher 30 is freely slidable along the guide rail 32. The pusher also includes an end tab 35 that is positioned to register with the tracks of a toothed document timing belt 37. As such, when the stack of documents is initially loaded into the bin, the pusher is rotated about guide rail 32 to disengage tab 35 of the pusher 30 from the tracks of the timing belt 37. The pusher 30 is then slid longitudinally along guide rail 32 into contact with the document stack. The pusher 30 is then rotated back into a drive position so that the tab 35 engages the tracks of the timing belt 37. The timing belt drives the pusher 30 so that the document pusher 30 moves longitudinally along the guide rail 32 as the stack of documents advances toward the feed assembly 40. A sensor 33 at the end of the guide rail 32 detects when the document pusher 30 reaches the end of the guide rail, which indicates that the stack of documents has been fed into the feed assembly 40. The Host PC 205 in response to the system controller 15 then indicates to the operator that the input conveyor 24 is empty.

The timing belt 37 that drives the document pusher 30 is driven by the same motor 27 that drives the input conveyor 24 so that the timing belt and the input conveyor can be driven to move at the same speed. In this way, the document pusher is driven by the timing belt 37 to push the stack of documents, together with the input conveyor 24, toward the feed assembly 40 while the document pusher also functions to support the back end of the stack of documents.

The front end of the stack of documents is moved into engagement with the motor-driven thumper wheel 34. The thumper wheel 34 is a generally square shaped wheel with rounded corners. The thumper wheel is driven by step motor 41 which also serves to drive the feed assembly 40. The thumper wheel provides eccentric cornered surfaces which function as a cam for supporting the stack without creating drag that would prevent the feed assembly 40 from engaging the front-most document. The thumper wheel 34 also functions to vibrate the stack to encourage the shingling downward of the front-most documents in the stack. The thumper wheel may be mounted on a spring biased pivot arm to help control the contact force with the document stack.

The documents on the input conveyor 24 enter the document path between the feed assembly 40 and an opposing, spring-biased retard 52. The leading document on the input conveyor 24 contacts the feed assembly 40, which forces the leading document between the feed assembly and the retard 52. The retard is spring biased toward the feed assembly 40.

The feeder assembly 40 is a belt and pulley drive assembly. A drive pulley 42 is connected to step motor 41 and thereby functions to drive the feeder assembly 40. The drive pulley 42 and an idler pulley 44 are spaced and supported by an adjustable yoke assembly 46. sandwiched between a pair of L-shaped brackets 46. A document drive belt 43 is carried on the drive pulley and idler pulley. The drive pulley 42 is pivotally mounted in fixed position relative to the base 38. The idler pulley 44 is not connected to the base 38, but is rotatably mounted at the terminal end of the yoke assembly 46. Because the idler pulley 44 is not mounted to the base 38, the feeder assembly 40 pivots relative to the base 38 relative to the base 38 about the central axis of the drive pulley 42. An extension arm on the yoke assembly 46 is connected to a spring 50. The spring 50 biases the feeder assembly 40 toward the retard 52, and against the stack of documents on the input conveyor 24.

The L-shaped brackets 46 are also connected to a feed pressure indicator 48 that is used to monitor the contact force of the documents on the input conveyor 24 against the drive belt 43 of the feed assembly 40. The force of the stack of documents against the feed assembly 40 causes the feed assembly 40 to pivot about the central axis of the drive pulley 42. The spring 50 opposes the pivoting of the feed assembly in response to the document pressure. The feed pressure indicator 48 is a linear variable differential transformer ("LVDT") that monitors the rotation and position of the yoke assembly 46 thereby determining the extension of the spring 50. The spring extension is proportional to the force applied to the spring. Therefore, based on output from the feed pressure indicator 48, the controller 15 is able to determine the force applied to the spring and thereby determine the force applied against the feed assembly 40 by the documents on the input conveyor 24. Although a position indicator is used in the present embodiment to determine the force of the documents against the feed assembly 40, alternative indicators can be used. For instance, a device that monitors force more directly, such as a strain gauge, can be used.

By monitoring the force of the documents against the feeder assembly 40, the controller 15 can function to control the speed of the motor 27 that drives the input conveyor 24 and the timing belt 37 driving the document pusher 30. For instance, if the document force against the feeder assembly is less than a predetermined amount, the speed of the motor 27 may be adjusted to increase the feed of the documents toward the feeder assembly 40.

A cleaning brush 51 is positioned in engagement with the feed conveyor belt 43 to clean ink and other debris from the belt during operation. A fixed bearing 45 is disposed on the inside of the feed conveyor belt 43 between the drive pulley 42 and the idler pulley 44. The fixed bearing 45 engages the inner surface of the feed conveyor belt 43 opposite the retard 52 in order to maintain the nip formed between the belt 43 and the retard 52 during pivotal movement of the feeder assembly 40. Otherwise, the belt 43 may have a tendency to move out of operable contact with the retard 52.

To ensure that a leading document and the next trailing document from the stack 16 are not fed simultaneously, the retard 52 is designed to have a lower coefficient of friction than the feeder assembly 40. In addition, the coefficient of friction at the face-to-face contact between the leading and trailing documents must be less than the coefficient of friction between the trailing document and the retard and therefore less than the coefficient of friction between the feed assembly 40 and the leading document. Accordingly, when the lead document is in contact with the feeder assembly 40, the trailing document is in contact with the retard 52. Because the coefficient of friction of the feed assembly 40 is greater than the coefficient of friction of the retard 52 and is also greater than the coefficient of friction between the documents, the leading document is fed into the document path before the trailing document. In effect, the feeder assembly causes the leading document to slide away from the face-to-face contact with the trailing document while the retard functions to hold the trailing document back. Accordingly, only one document at a time is fed into the document path.

From the feeder assembly 40, the documents are fed one at a time into a pitch or gap compensation zone 60. As the documents enter the compensation zone, the documents pass between a pair of document guides 68, and past a feed sensor 54. The feed sensor 54 is an infrared sensor employing an infrared emitter on one of the document guides 68 and an infrared receiver on the opposing document guide. The feed sensor 54 senses the existence of a document, including a leading and/or trailing edge of the document, within the document guides 68 at the location of the sensor and sends an output signal to the controller 15.

The feed sensor 54 is used to determine and control the documents leaving the feeder assembly 40. If the flow of documents past the feed sensor is interrupted, the feed sensor functions to indicate a lack of document flow. The controller 15 then stops the feeder assembly step motor 41 and indicates to the operator that documents may be jammed in the feed assembly 40 or, depending on the status of the sensor 33 along guide rail 32 in the input bin 14, that no documents remain on the input conveyor 24. The rate at which documents pass the feed sensor 54 may also be used by the system controller 15 to effect dynamic monitoring and adjustment of the feed pressure between the document stack and the feeder assembly 40. For example, the controller 15 can determine whether documents are slipping against the feed assembly 40, as a result of wear, so that the controller can then respond by controlling the speed of the input conveyor motor 27 to increase the speed of the input conveyor 24 and the timing belt 37 to thereby increase the force of the document stack against the feed assembly to compensate for the slippage. For example, as belt 43 begins to wear, the feed rate of documents will begin to slow down thereby decreasing the throughput of the apparatus. In order to account for wear, the target range of the contact pressure should be dynamically adjusted in order to maintain throughput efficiency. Likewise, dynamic monitoring of the document count and pitch also enables dynamic changes to be made in contact pressure to account for other criteria such as the use of a replacement belt or changes in paper characteristics of the documents.

After passing the feed sensor 54, the documents enter either a hard or slippery nip 62 formed between a pair of rollers 64a and 66a. One of the rollers is a drive roller 64a, and the other is a spring-biased idler roller 66a that is linked to a LVDT to enable the system controller 15 to monitor the spacing between rollers 64a and 66a at the nip 62. When the nip 62 between the rollers is configured as a hard nip, the frictional force between the rollers 64a, 66a and the documents is greater than the frictional force between the feed assembly 40 and the documents. As a result, the rollers 64a, 66a take control of transporting a document from the feed assembly 40 once the document enters the hard nip 62. Employing a hard nip is advantageous for the purpose of achieving aggressive control over documents in the compensation zone. The use of a hard nip results in more consistent gaps between documents for purposes of maintaining consistent uncompensated feeding.

Alternatively, in certain applications, a slippery nip 62 may be more desirable. By reducing the contact force between rollers 64a and 64b, the frictional force of the nip 62 is decreased so that the feed assembly 40 can function to still maintain control over documents as the documents are passed to the compensation zone. Using a slippery nip reduces control over the leading edge of the documents resulting in variable gaps between documents, but reduces the stress on the documents resulting in less damage to the documents.

The rollers 64a and 66a are the first of a plurality of pairs of drive rollers 64 and spring-biased idler rollers 66 that function to transport the documents through the compensation zone 60. The spring force between rollers 64a and 66a at nip 62 is greater than the spring force between the remaining pairs of rollers 64 and 66. The drive rollers 64 are interconnected and are driven by step motor 63. The compensation zone stepper motor 63 is not mechanically linked to the stepper motor 41 for the feed assembly 40. However, the compensation zone step motor 63 and the feed assembly stepper motor 41 are logically linked by the system controller 15 which functions to control the speed of both motors. The controller 15 controls the motors so that the compensation zone conveyor moves documents at a greater rate of speed than the feed assembly. For example, the compensation zone conveyor may move documents at a speed rate that is some constant, greater than 1, times the speed rate of the feed assembly 40. In addition, this relationship causes the gap between documents to increase when passing from the feed assembly 40 to the compensation zone 60.

In the compensation zone 60, the pitch between leading edges of successive documents is adjusted so that a uniform pitch is maintained from document to document. For example, if each document of the transactional pair is a different length, uniform pitch ensures that the leading edge of each document is uniformly spaced from the leading edge of each successive document. However, the gaps between successive documents will not be uniform. Nevertheless, the gap between any two successive documents must be varied, when necessary, to achieve more uniform pitch. To adjust the gap between two successive documents, especially, a leading document and a trailing document, the speed of the trailing document relative to the leading document may vary for a selected period of time. After the leading document is conveyed through the compensation zone 60, the leading document enters a hard nip 74 at the system entrance. Once the leading document enters the system entrance hard nip 74, the system transport 76 controls the speed at which the leading document is transported. When the leading document enters the system entrance hard nip 74, the speed of the trailing document is still controlled by the rollers 64, 66 in the compensation zone. The speed of the trailing document being conveyed through the compensation zone is adjustably variable from approximately 35 to 100 inches per second while the leading document is conveyed by the system transport 76 at a constant rate of about 100 inches per second.

The gap between the leading and trailing documents is determined using two sensors. The two gap sensors are located at opposite ends of the compensation zone 60. The first gap sensor, referred to as a compensate entry sensor 69, is located toward the beginning of the compensation zone adjacent to the first pair of rollers 64a, 66a. The second gap sensor, referred to as the system entry sensor 72, is located at the end of the compensation zone, adjacent the system entry hard nip 74. Both of the gap sensors are infrared sensors that straddle the document path, with an infrared emitter on one side of the document path and an infrared receiver on the opposite side of the document path.

If the pitch between the lead edge of the leading document detected at sensor 72 and the lead edge of the trailing document detected at sensor 69 is not within a preset range, the controller 15 determines the rate at which the trailing document should be conveyed through the compensation zone 60 to adjust the gap between the leading and trailing documents. The controller 15 determines the necessary speed of the trailing document based on the pitch between the leading and trailing documents, the distance between the gap sensors 69 and 72, the distance between the system entry sensor 72 and the system entrance hard nip 74, and the speed at which the system transport 76 transports the leading document. Based on the determination of the necessary speed, the controller 15 controls the compensation zone stepper motor 63.

A thickness indicator 70 also measures the thickness of the documents while the documents are conveyed through the compensation zone. The thickness indicator is an LVDT device similar to the feed pressure indicator 48. The thickness indicator 70 senses whether one, two or multiple documents are being fed simultaneously through the compensation zone. In general, if a document thickness is above a predetermined thickness, the controller either stops the feeder 20, or outsorts the document or documents to the reject bin 120. More specifically, the thickness detector may function to detect a double feed, a multiple or triple feed as well as an imperfect single having, for example, a foreign substance or tape. If an improper single is detected, the system controller 15 will cause the improper single and its corresponding document from the document pair to be outsorted to the reject bin. If a simultaneous multiple or triple feed is detected, the controller will cause a jam condition to stop operation of the apparatus. If a double feed is detected and the system controller determines that the double feed is a single transaction, the controller will cause the double feed to be outsorted to a reject bin. If, however, a double feed is detected and the controller determines that the double feed crosses transactional boundaries, the controller will cause the double feed as well as the immediately preceding and the immediately following documents to be outsorted to the reject bin.

From the compensation zone 60, the documents enter the system transport 76. The system transport 76 includes a plurality of motor-driven belts that convey the documents through the system to determine the order and orientation of the documents and, if necessary, to reorder and/or reorient selected documents.

From the compensation zone 60, the system transport 76 first conveys the documents to a justifier 78a that justifies an edge of each of the documents relative to the base plate 38 so that each document may be maintained in proper position for imaging. The documents are then conveyed past an imaging module 80 that includes a pair of line scanning cameras 81a, 81b. The first camera 81a scans one side of each document and the second camera 81b scans the other side, so that images of the front and back of each document can be produced. After scanning a document, the imager module 80 determines the orientation of the document and particularly invoice documents.

From the imager module 80, the documents are then transported to a MICR module 85 that determines the orientation of documents having magnetic markings, such as checks. The MICR module 85 functions as a magnetic imaging module and includes a magnet 87 for magnetizing the magnetic ink markings on the checks and a plurality of magnetic read heads 88 for reading the location of the magnetized markings. The documents are first conveyed past the magnet 87 which imparts a magnetic charge to the magnetic ink on the checks. The documents are then conveyed past a plurality of magnetic read heads 88 which detect the variations in magnetic flux as the magnetized markings of the checks are conveyed past the read heads. After reading the variations in magnetic flux, the MICR module 85 determines the orientation of each magnetized document or check. Based on the output from the imager module 80 and the MICR module 85, the controller 15 determines whether the documents of a particular transaction, typically a check and a corresponding invoice, are in the proper sequence.

Figure 7:
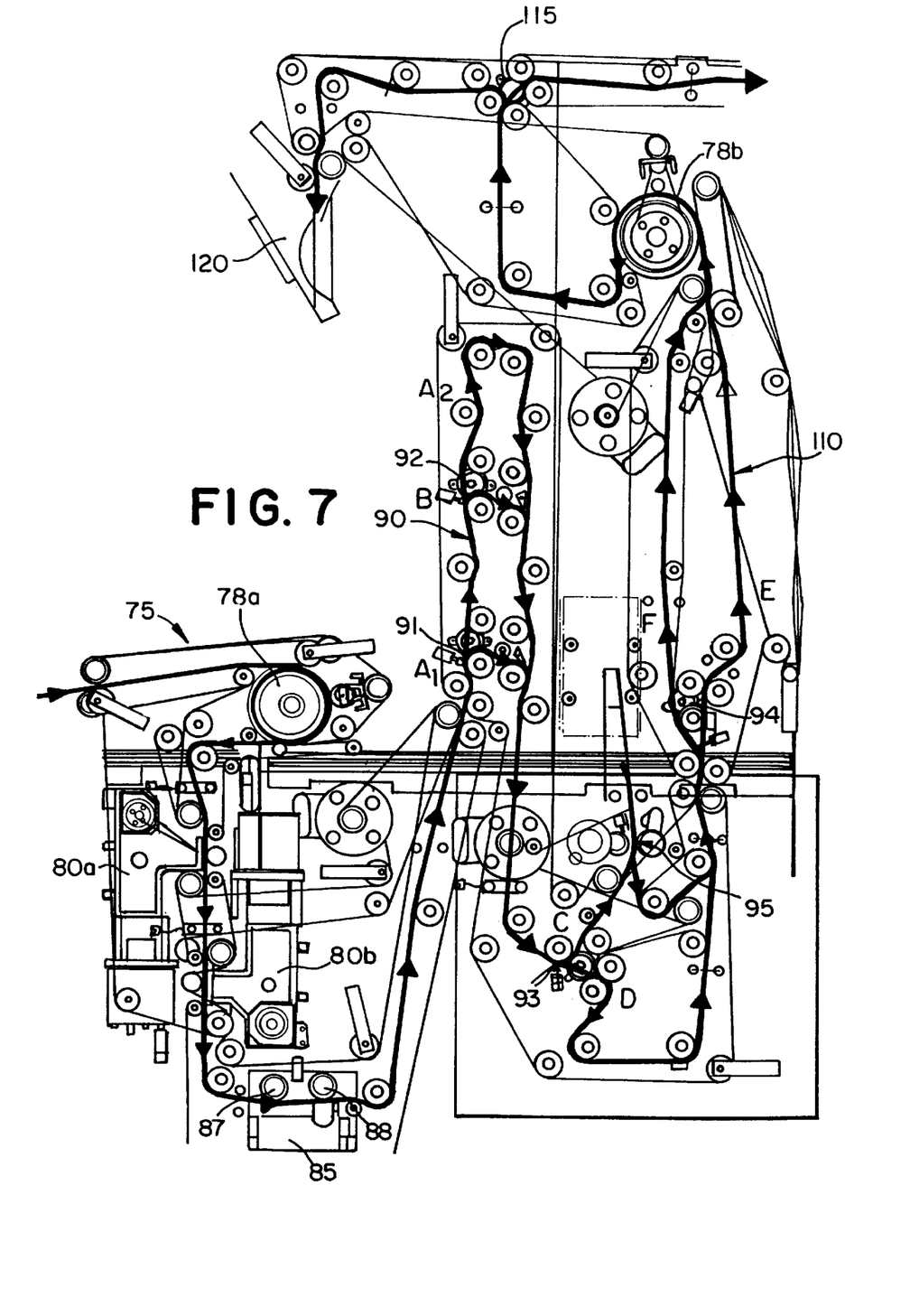
FIG. 7 is an enlarged fragmentary front elevational view of the ordering and orienting sections of the automated document processing apparatus illustrated in FIG. 2, illustrating the flow of documents through the ordering and orienting sections.

The documents are then transported to a reordering device 90. If the documents in a transaction are not in the proper sequence, the reordering device 90 reorders the sequence of the documents along the path of movement. For instance, if a check precedes a corresponding invoice in an application where the invoice should precede the check, the reordering device directs the invoice along a short path of movement and directs the check along a separate longer path of movement. When the invoice path and check both recombine, the invoice precedes the check along the combined path of movement. Referring to FIG. 7, if two documents are out of sequence, the controller 15 controls the gates 91 and 92 of the reorder device 90 so that the leading document is directed by gates 91 and 92 along the longer path designated A2. The trailing document is directed by gate 92 along the short path designated A1. If a pair of documents does not require reordering, both documents are directed by gates 91 and 92 along the normal path designated B.

From the reordering device 90, the system transport 76 conveys the documents to a reverser 95. The details of the reverser are illustrated in greater detail in FIG. 4. If necessary to reorient a document, the reverser flips the document from front to back so that the leading edge of the document becomes the trailing edge of the document. Referring to FIG. 7, if a document requires reversing, the controller 15 causes gate 93 to direct the document along the reverser path designated C. If a document does not require reversing, the document is directed by gate 93 along the normal path designated D.

Prior to entering the reverser 95, the system transport 76 conveys the documents over a corrugator 93 that imparts a curve or bend about a longitudinal axis of the documents. This bending provides strength to the otherwise flexible document to aid in the reversing process.

Figure 4:
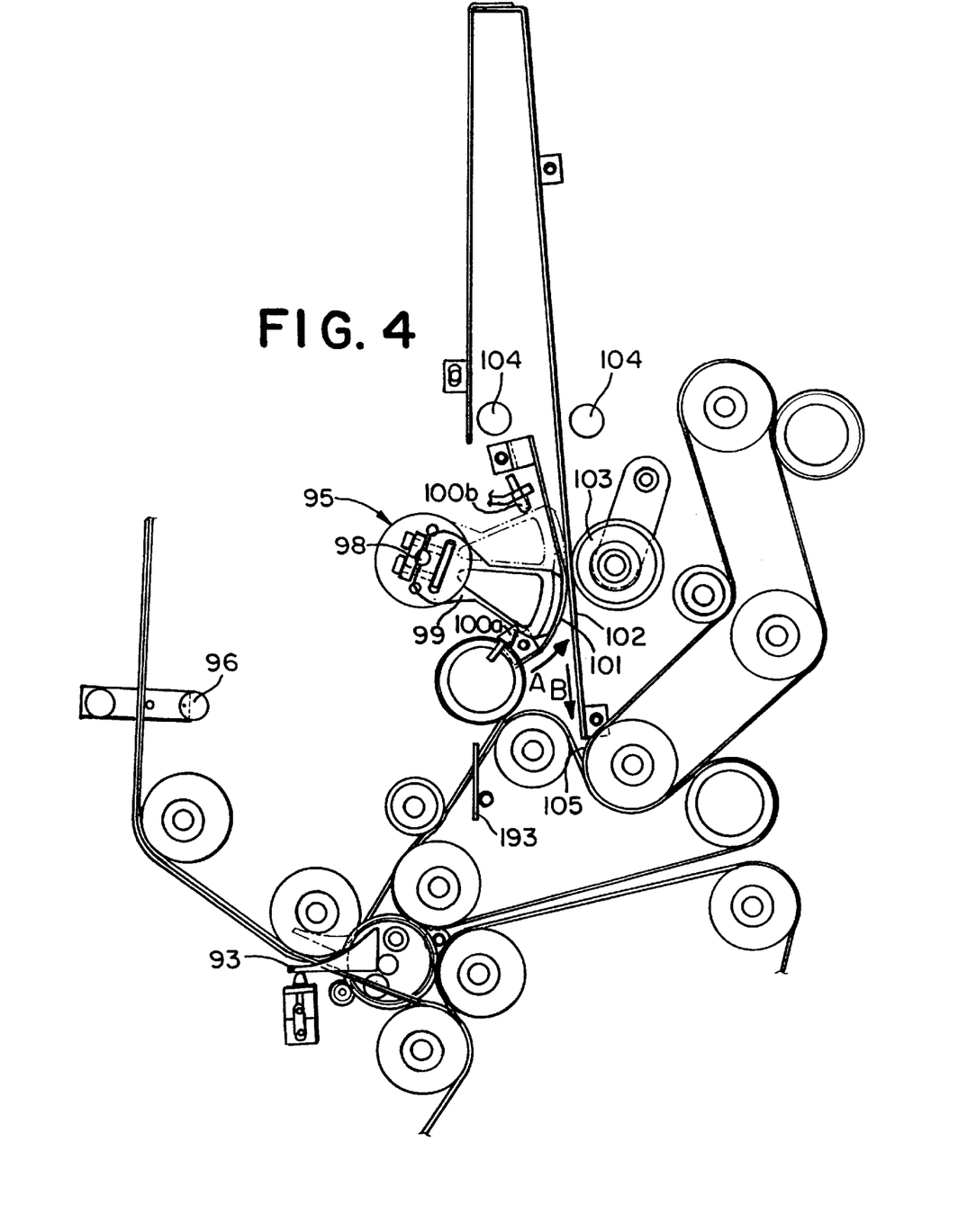
FIG. 4 is an enlarged fragmentary front elevational view of the reverser of the automated document processing apparatus shown in FIG. 2.

The flow of the documents into the reverser is shown by arrow A in FIG. 4. After passing over the corrugator 93, the system transport 76 directs the document into the reverser along a curved inner guide 101 and into an opening formed between the inner guide 101 and a straight outer guide 102. An actuatable, pivotable reverser arm 99 is positioned adjacent the inner guide 101. Opposing the reverser arm 99 along the path of movement is a roller 103 which is spring-biased toward the reverser arm. The inner guide 101 has a cutout allowing the reverser arm 99 to contact the document as the document enters the reverser. Similarly, the outer guide 102 has a cutout allowing the roller 103 to contact the document as the document enters the reverser. In this way, when a document enters the reverser, the document is engaged on one side by the reverser arm 99 and on the other side by the roller 103.

The reverser arm 99 pivots between two positions to reverse a document. As a document enters the reverser, the reverser arm is in a first position resting against a stop 100a. In FIG. 4, reverser arm 99 is shown in full lines in a lower or first position. In this first position, a small gap exists between the reverser arm 99 and the guide 102 to enable a document to pass therebetween. The reverser arm 99 is actuated at a selected time relative to the movement of the document into the reverser so that the reverser arm 99 is pivoted upwardly toward a second stop 100b. In FIG. 4, the reverser arm is shown in dashed lines in the second or upper position. As the reverser arm 99 pivots to the second position, the document in the reverser is sent upward past a jam sensor 104. The jam sensor 104 indicates whether a document directed to the reverser 95 made it to the reverser or whether the document jammed or was otherwise misprocessed. After pivoting upwardly to the second position, the reverser is held in position for a selected time period depending on the length of the document in the reverser. Then, the reverser arm 99 reverses and pivots downwardly to the first or lower position against stop 100a. As the reverser arm 99 pivots downward, the document is sent downward along the straight outer guide 102, as indicated by arrow B in FIG. 4. The document then enters a nip 105 and is conveyed to the system transport 76.

The motion of the reverser arm 99 between the upper and lower positions is actuated by a rotary solenoid. The reverser arm 99 is mounted on the shaft 98 of the solenoid. The timing for actuating the solenoid is dependent on sensor 96. The actuation sensor 96 indicates the presence of a document that is to be directed to the reverser 95. The sensor 96 functions to detect the lead and trail edge of a document being directed to the reverser. The pivot arm is fired based on the detection of the trail edge of the document by sensor 96 in order to maintain the position of the lead edge of the document in the document flow path after document reversal has been effected. Accordingly, the reverser arm is held in its second position depending on the length of the document being reversed. For a short length document, the firing delay is longer so that the document is held in the reverser for a longer period of time. For a longer length document, the firing delay is shorter so that the document is held in the reverser for a shorter period of time.

The reverser 95 can be mounted in a horizontal orientation. However, in the present instance, the reverser 95 is mounted in a vertical orientation, with the reverser arm 99 positioned vertically above the reverser exit nip 105. This vertical orientation enables documents to be conveyed from the reverser 95 to exit nip 105 with gravity assistance.

From the reverser 95, the documents are transported to a twister 110. Referring to FIG. 7, if a document requires twisting from an upside-down orientation into a right-side-up orientation, the controller 15 operates gate 94 to direct the document to the twister path designated E. If a document does not require twisting, the document is directed by gate 94 to the twister path designated F. The twister is a pair of belts that are twisted 180 degrees along the run of the belts so that a document is flipped from top to bottom as the document is transported by the belts. In this way, the twister rotates a document, flipping the document from front to back and from top to bottom.

The documents are then conveyed to a second edge justifier 78b that justifies an edge of the documents relative to the base plate to enable more uniform output stacking. From there, the documents are transported to a gate 115 that pivots between two positions. Based on signals from the controller 15, the gate 115 directs each document either to a rejection bin 120, or to a stacker 125 that sorts and stacks the documents in a plurality of bins. Referring to FIG. 8, based on criteria set by the operator, the stacker directs the documents to one of the paths designated $G_1$, $G_2$, $G_3$, or $G_4$. For example, documents may be sorted to selected output bins based on various markings detected on the documents, such as change of address boxes or bar codes on invoices. The documents may also be sorted based on other criteria, such as document length to account for size differences between business checks and personal checks.

Figure 5:
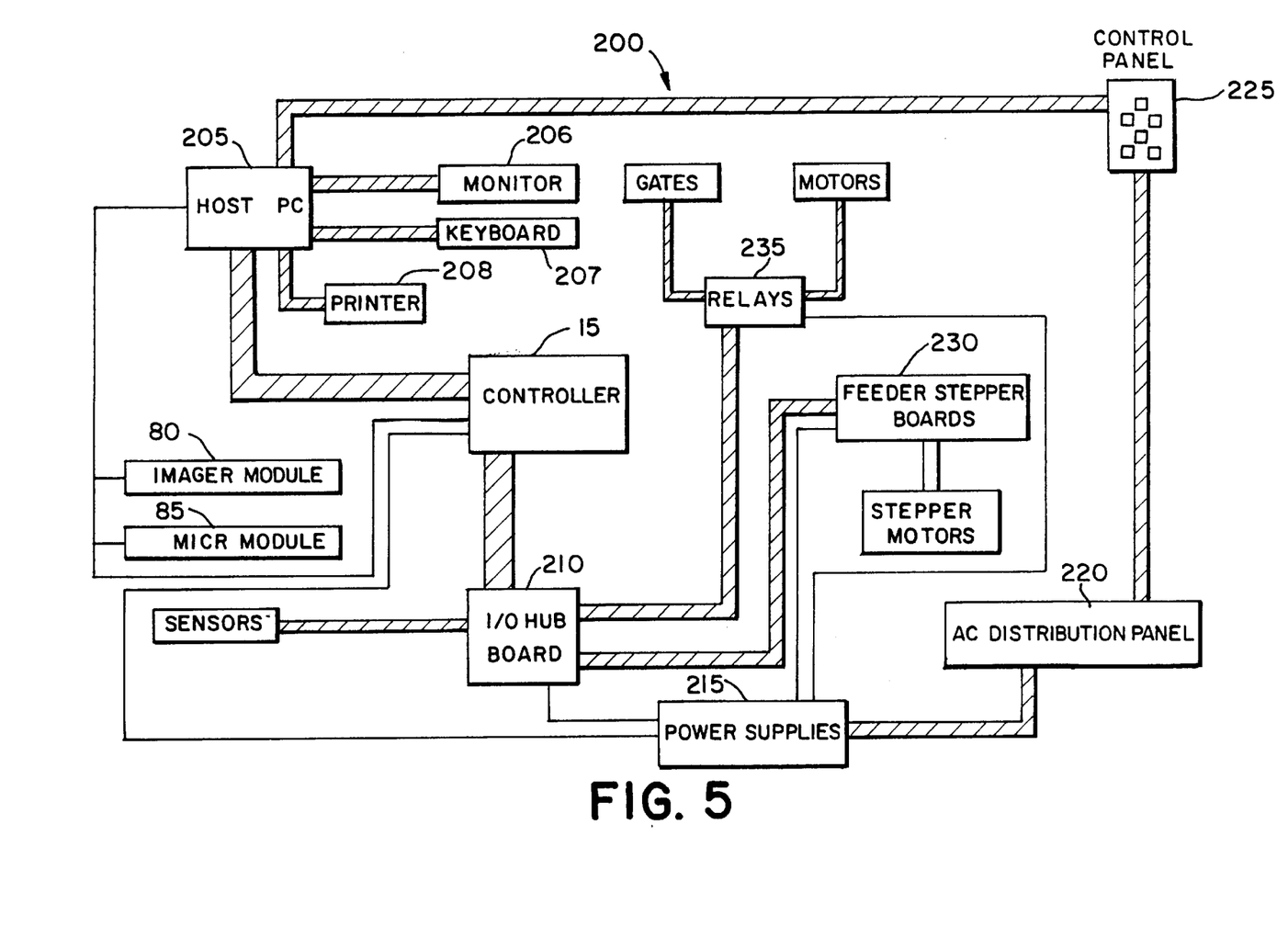
FIG. 5 is a schematic block diagram of the electrical circuitry for the automated document processing apparatus shown in FIG. 2.

Operation of the control system 200 will now be considered in greater detail. The control system 200, as shown in FIG. 5, controls the operation of the various subsystems of the device 10, and coordinates the various processing operations. The control system 200 includes the system controller 15 that receives data from input signals and generates output signals to the various subsystems of the apparatus 10.

The controller 15 is connected to a host computer 205 that provides operator access to the control of the device 10. A monitor 206, a keyboard 207, and a printer 208 are connected to the computer 205 to allow an operator to interface with the device 10. Similarly, a control panel 225 is connected to the controller 15 via the host computer 205. The control panel 225 allows an operator access to various operations of the device, such as starting or stopping jobs on the system.

The host computer 205 is also connected to the imaging module 80 and the MICR module 85. Based on the documents being processed, the host computer 205 sends signals to the imaging module 80 and the MICR module 85 regarding parameters necessary to process the documents. For instance, the host computer may send signals to the imaging module regarding a mark on invoices for which the cameras should scan to determine the orientation of each invoice. Based on the parameters received from the host computer 205 and the data received when the documents are scanned, the imager and MICR modules determine the orientation of each document. The imager and MICR modules then send a signal to the controller 15 regarding the orientation of each document so that the controller can control the further processing of each document.

The controller 15 controls the operation of the various subsystems of the device 10 via an input/output hub board 210, referred to as an I/O hub. The operation of the various subsystems are controlled based on signals the controller 15 receives from the host computer 205, the imaging and MICR modules, and the various sensors throughout the device 10. The controller 15 controls the operation of the motors that drive the system transport 76 and the stacker 125. The controller 15 also controls the various gates via a series of relays 235 that are connected to the I/O hub 210. The stepper motors 41 and 63 that drive the feeder 20 are controlled by the controller via a series of feeder stepper boards 230 that are connected to the I/O hub 210. A plurality of power suppliers 215 in combination with the controller 15 and an AC distribution panel 220 supply and control the power for the subassemblies.

Modes of Operation

The following description details the techniques used to process documents through the apparatus 10. The apparatus may operate in at least six different modes.

The various modes may also operate in an aggressive, moderate or safe manner of operation. In general, when operating in an aggressive manner, the emphasis is on maximizing throughput by attempting to determine the transactional boundaries when unexpected, unknown or bad transactional boundaries are encountered. However, in the aggressive manner of operation, the apparatus is more likely to misplace transactional boundaries defining only those documents that were removed from a single envelope. In other words, in the aggressive manner of operation, the apparatus is more likely to mistakenly associate documents that were extracted from different envelopes. For example, a check from envelope A might be mistakenly processed as if the check accompanied an invoice from envelope B. The safe manner of operation emphasizes correct output, so that the machine stops when unexpected, unknown, or bad transactional boundaries are encountered. The moderate manner of operation is intermediate the aggressive and safe manners of operation.

Operations Common to all Jobs

The following operations are common to all six modes of operation. Documents are initially fed from the feeder assembly 20 into the system transport 76 in a serial fashion. The documents are monitored for proper pitch or separation between adjacent documents. A path sensor measures document length, pitch, and gap, while the thickness indicator 70 measures document thickness to validate that only a single document has been fed. If the length of a document exceeds expected bounds, the long document and the other documents in the same transactional boundary may be directed to the reject bin 120. If the feed gap and/or pitch between documents in a transaction is out of tolerance, all documents in the transaction again may be directed to the reject bin. If the feed gap and/or pitch between adjoining transactional boundaries is out of tolerance, all the documents contained in both transactional boundaries may be directed to the reject bin. Finally, if the measured thickness is too large, which may be caused by a double feed, the machine may be stopped or the double feed may be directed to the reject bin. The transactional boundary in each of the above four scenarios will be identified, in part, by the MICR module 85. Of course, identification of transactional boundaries is also dependent on the manner of operation being executed (i.e. safe, moderate, or aggressive).

Documents are scanned by the MICR module 85 for MICR information. After examining the magnetic ink signature, the MICR module identifies the document as a check or "unknown". If the document is a check, the orientation of the check is also determined. If the MICR module identifies a document as "unknown", the controller handles the document as if the document is an invoice.

The fact that most checks are either 6 inches or 8.25 inches long may be used to verify the output of the MICR and/or imager modules. This "length identification" will classify documents into one of two categories: (i) an invoice, or (ii) a check with unknown orientation.

Ordered Clean Single Mode

The first mode of operation is referred to as an ordered clean singles mode of operation which processes singles that are known to have misoriented checks. Singles are transactions containing one check and one invoice. The ordered clean singles mode of operation processes singles by verifying and correcting the orientation of misoriented checks.

The ordered clean singles mode accepts transactions consisting of one check and one invoice that are consistently ordered in an invoice/check or check/invoice sequence. All invoices are assumed to be in the same orientation. Although facing front, right-side up is the preferred orientation for the invoices, any of the four possible orientations are processed. However, there should be consistency throughout the batch with respect to invoice orientation and invoice/check sequence.

Transactions are fed into the system transport 76 in a serial fashion. Depending on the batch that is loaded, the sequence will either by invoice/check or check/invoice. Typically, invoice/check ordering is used, however, there are instances when feeding the check first is advantageous. For example, in some cases the MICR module 85 requires additional time for decision making. Because gate directions are contingent in part on MICR module decisions, feeding the check first allows for longer processing time before a decision needs to be made for a single transaction.

The system controller 15 tracks each document as the documents move through the system transport 76 and associates each document with signals from the MICR module 85 corresponding to each respective document. The ordering (for example, invoice, check, invoice, check) of the batch of documents placed on the input conveyor 24 is specified as a job parameter. As long as the specified order is maintained, the transactions are directed to the proper bin of the stacker 125. If the first document fed does not match the order specified by the job parameter (invoice or check), the machine will be stopped. However, if an out-of-order sequence is detected after the first document is fed, corrective action will be taken based on the selected manner of operation. The actions taken will be described wherein X refers to a document in a particular transaction and Y refers to the corresponding document from the same transaction. For instance, X and Y may be a corresponding check and invoice.

In the safe manner of operation, any sequence containing a repeated X or a repeated Y (e.g. "X, X" or "Y, Y") will result in stoppage of the apparatus. In the moderate manner of operation, if the sequence "$X_{N-1}, Y_{N-1}, Y_N, X_N, X_{N+1}, Y_{N+1}$" is observed, the controller will direct the pair $Y_N, X_N$ to the reject bin because the pair is assumed to be misordered. All subsequent sequences observed while running in the moderate manner of operation that have a repeated X or Y will result in stoppage of the apparatus. If the sequence "$X_{N-1}, Y_{N-1}, Y_N, Y_N, X_{N+1}, Y_{N+1}$" or "$X_{N-1}, Y_{N-1}, X_N, X_N, X_{N+1}, Y_{N+1}$" is detected in the aggressive manner of operation, the controller 15 will direct the $N^{th}$ transaction to the reject bin 120. Additionally, in the aggressive manner of operation if the sequence " . . . $X_{N-1}, Y_{N-1}, X_N, X_N, Y_N, X_{N+1}, Y_{N+1}$" or the sequence " . . . $X_{N-1}, Y_{N-1}, X_N, Y_N, Y_N, X_{N+1}, Y_{N+1}$" is observed, the controller will direct the $N^{th}$ transaction to the reject bin 120. When operating in the aggressive manner of operation, all other sequences containing a repeated X or Y result in a stoppage of the apparatus.

In the aggressive manner of operation, the determination to reject a transaction rather than stopping the apparatus is based upon statistical monitoring and probabilistic techniques. These probabilistic techniques are based upon the fact that the batch of documents in the ordered clean singles mode of operation should be ordered singles. Various characteristics of ordered singles can be used as characteristic norms for monitoring the processing of the documents. For instance, the percentage of checks in the same orientation is generally consistent for any given batch of ordered singles. Therefore, the controller 15 monitors the orientation of the checks for a given batch of documents. If the percentage of checks in the same orientation in a particular batch deviates significantly from the expected percentage, then the controller makes a determination that transactional boundaries are not being properly tracked and operation of the apparatus is stopped.

During the ordered clean singles mode of operation, the imager module 80 may also detect marks and address changes on documents. A transaction having a document with a mark or address change may be directed into a selected output bin.

During operation in the ordered clean singles mode, properly paired and oriented transactions are directed to a stacker 125 that sorts and stacks the documents into output bins. Invoices and checks may be independently oriented and stacked based on a job parameter setting.

Misordered Clean Singles Mode of Operation

The second mode of operation is referred to as the misordered clean singles mode, which processes singles (one check and one invoice per transaction) that have unspecified ordering and orientation. The apparatus identifies the ordering and orientation of the transactions, and tracks transactional boundaries. The misordered clean singles mode processes singles by verifying and correcting misoriented or misordered checks and invoices.

The misordered clean singles mode processes transactions consisting of one invoice and one check ordered in an invoice/check or check/invoice sequence. ordering is not necessarily consistent throughout the documents placed in the input bin. In addition, the documents in the stack may be in any orientation. A batch of documents with these characteristics is usually generated from documents extracted from windowless envelopes.

To monitor the transactional boundaries, the apparatus monitors the characteristics of the processed mail and compares the monitored characteristics to expected norms. When the processed mail does not conform to the expected norms, a transactional boundary was probably misplaced at some point during the run.

Various characteristics of documents can be used as expected norms for tracking transactional boundaries. In the present instance, at least three characteristics may be used as expected norms, namely: (1) the percentage of transactions in which the invoice precedes the check; (2) the percentage of transactions in which the invoice precedes the check for transactions that have both documents oriented right-side up; and (3) the percentage of transactions that have an invoice and a check with the same orientation. For example, if the mail processed by the apparatus indicates that the mail being processed has a percentage of transactions having a check-invoice sequence that deviates significantly from the expected norm, a transactional boundary was probably misplaced and operation of the apparatus is stopped. Using this probabilistic technique to verify transactional boundaries may result in some documents being shuffled if a transactional boundary is misplaced. The number of misplaced transactional boundaries can be reduced, however, by simultaneously monitoring several characteristics. The number of misplaced transactional boundaries may further be reduced if monitoring characteristics are selected that have expected norms that approach a 100% or 0%.

The controller 15 monitors statistics of document characteristics that are used to track transactional boundaries to ensure that the characteristics remain within specified limits. The specified limits are selected based on the manner of operation such as the aggressive manner of the safe manner. The safe manner has the smallest range between limits and the aggressive manner has the largest range between limits. Whenever a characteristic statistic exceeds the specified limits, the apparatus stops processing the documents. In addition, the apparatus may stop processing the documents when a repeated check or invoice is detected within a transactional boundary.

During the misordered clean singles mode of operation, documents are scanned by the MICR module 85 for check orientation and by two image cameras 81a, 81b (front and back) for invoice orientation. The system controller 15 matches signals from these modules with corresponding documents in the system transport 76 and sorts the documents based on stacking details that are specified in the job setup. Invoices or checks designated by the MICR and imager modules as having an "unknown orientation", along with the other corresponding documents in the respective single transactions are directed to the reject bin 120. The imager module 80 may also detect marks and address changes on documents. A transaction having a document with a mark or address change may be directed into a selected output bin.

During operation in the misordered clean singles mode, properly paired and oriented transactions are directed to a stacker 125 that sorts and stacks the documents into output bins. Invoices and checks may be independently oriented and stacked based on a job parameter setting.

Check Only Mode

The third mode of operation is referred to as the check only mode, which verifies and corrects check orientation from an input stack consisting of only checks. The checks fed into the apparatus may be oriented in any fashion. Properly fed documents are scanned by the MICR module 85 for check orientation. Any document that the MICR module identifies as an invoice, or unknown document is directed to the reject bin 120. Additionally, a document is directed to the reject bin if the document has an unknown check profile. Properly oriented checks are directed to the stacker 125, which stacks the checks into sequential bins based on a job parameter setting.

Invoice Only Mode

The fourth mode of operation is referred to as the invoice only mode, which verifies and corrects invoice orientation from an input stack consisting of invoices only. The invoice only mode also contains an option to sort documents based on marks detected by the imager module 85. The documents fed into the input bin 14 may be oriented in any fashion.

Properly fed invoices are scanned by the imager module 85, which determines the orientation of the invoice and/or determines the presence or absence of a mark, such as a check mark in a response box. Invoices that the imager module cannot identify are directed to the reject bin 120. Properly oriented invoices are directed to the stacker 125 which sorts and stacks documents into output bins.

Flow Same Bin Mode

The fifth mode of operation is referred to as the flow same bin mode, which processes singles or multis that have misoriented documents. The flow same bin mode verifies and corrects misoriented checks or invoices, but does not track transactional boundaries. Checks and invoices flow to the same stacker bin. Any unknown checks or invoices flow through the system, and are not rejected. The documents to be processed during the flow same bin mode need not be in any particular orientation or sequence.

Documents are fed into the system transport 76 in a serial fashion. The controller 15 tracks the documents as the documents move through the system transport 76 and associates signals from the MICR module 85 and imager module 80 to each respective document. Whenever a document is misoriented, the apparatus reorients the document. Documents that cannot be identified flow through the apparatus. The stacker 125 directs the documents to an output bin, switching destinations only when a bin is full.

Flow Separate Bin Mode

The sixth mode of operation is referred to as the flow separate bin mode, which processes singles or multis that have misoriented documents. The flow separate bin mode verifies and corrects misoriented documents, but does not track transactional boundaries. Checks and invoices flow to different stacker bins. Depending on the manner of operation, documents that cannot be identified as a check or invoice may be rejected or may be assigned a "best guess" destination. There does not need to be consistency throughout the batch with respect to document orientation and invoice/check sequence.

Documents are fed into the system transport 76 in a serial fashion. The controller 15 tracks the documents as the documents move through the system transport 76. The controller also associates signals from the MICR module 85 and imager module 80 to each respective document. Whenever a document is misoriented, the apparatus reorients the document. All documents that cannot be identified by the MICR or imager modules may be rejected. Alternatively, the controller may determine the identity of an unknown document based on a "best guess". The "best guess" is based on the identity of the documents in front of and behind the document in question, and the length of the document in question. The orientation of the document in question is not altered.

Transactional Boundary Tracking

For purposes of defining and verifying transactional boundaries between transactional pairs of documents, a control document, which is neither a check nor an invoice, may be inserted into the batch of documents at selected intervals. Since there is complexity in determining transactional boundaries in the document stack, one or more control documents could be helpful for purposes of intermittently or periodically marking a definite transactional boundary within the document stack.

The control document may include identifying markings that can be detected either by the imager module or the MICR module for purposes of identification by the controller to verify that a particular transactional boundary is proper. If proper, the control document can be directed to a designated output bin or to the reject bin. If, however, the control document appears at a place in the document flow where the system controller does not expect to detect a transitional boundary, then a processing error has occurred and the apparatus will be shut down.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

We claim:

1. A method for processing a stacked batch of at least pairs of documents previously extracted from envelopes comprising:

A) providing a stacked batch of at least pairs of documents previously extracted from envelopes;

B) conveying pairs of documents from the stacked batch along a selected path of movement;

C) detecting the orientation of at least one document of each pair of documents along the selected path of movement; and D) selectively orienting at least the one document of selected pairs of documents along the path of movement in response to the detection of the orientation of the one document.

2. The method of claim 1 comprising:

A) detecting the order of each document of the pair of documents along the selected path of movement; and B) selectively changing the order of selected pairs of documents along the path of movement in response to the detection of the order of the pairs of documents.

3. A device for processing documents comprising:

A) a base;

B) an input conveyor for conveying documents mounted on the base;

C) a motor for driving said input conveyor;

D) a feed belt pivotally mounted on the base;

E) a biasing member urging the feed belt to pivot toward said input conveyor;

F) a sensor connected to the feed belt, said sensor being operable to sense the force of the documents on said input conveyor against the feed belt and send an output signal indicating the sensed force; and G) a controller for receiving the output signal from said sensor and controlling the speed of said motor in response to the output signal from said sensor.

4. A device for processing documents comprising:

A) a first document transport for transporting documents;

B) a reverser for receiving documents from the first document transport and reversing the leading and trailing ends of the documents, comprising:

(i) a reverser arm for engaging documents, the arm being pivotable between a first and second position;

C) a system entry nip of a second document transport for receiving documents from said reverser, said system entry nip being vertically spaced from said reverser arm, so that said reverser arm is above said system entry nip.

* * * * *